Dec. 20, 1932.  A. G. HEGGEM  1,891,417
STUFFING BOX
Filed Sept. 23, 1929   2 Sheets-Sheet 1

Inventor
Alfred G. Heggem
By Ritter & Ritter
His Attorneys

Dec. 20, 1932.  A. G. HEGGEM  1,891,417
STUFFING BOX
Filed Sept. 23, 1929  2 Sheets-Sheet 2
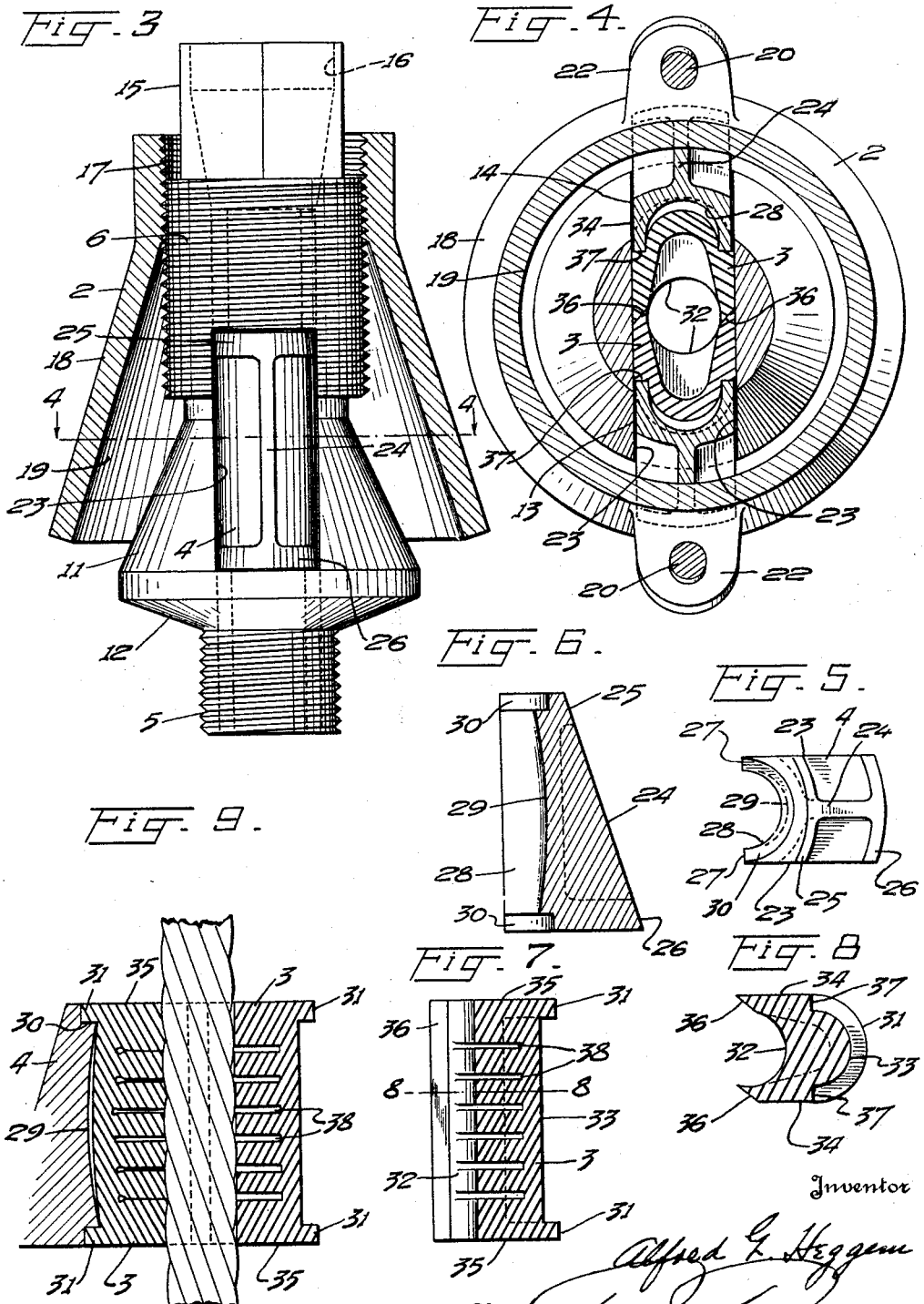

Patented Dec. 20, 1932

1,891,417

UNITED STATES PATENT OFFICE

ALFRED G. HEGGEM, OF TULSA, OKLAHOMA

STUFFING BOX

Application filed September 23, 1929. Serial No. 394,611.

My invention relates to stuffing boxes primarily suitable for association with a reciprocating element such as a polished rod or drilling line used in oil well operations.

The principal objects of the invention are to provide improved means for preventing leakage around the ends of the packing elements, to pack the reciprocating element more efficiently around its entire circumference, to allow for yielding contact of intermediate portions of the packing elements so as to lessen the danger of overheating the polished rod and thereby inducing unduly rapid wear of the packing, and to afford a form of packing element which will effectively perform its intended function until almost completely worn out.

The principal feature of the invention consists in providing the stuffing box with a member having a passageway for a reciprocating element, and in combining therewith oppositely disposed packing elements projecting into said passageway, wedge followers which are radially movable with respect to the passageway respectively cooperating with the packing elements, and a rotatable housing being employed for actuating the followers to force them and the packing elements with which they cooperate inwardly towards the axis of the passageway the packing elements being provided with bevelled edges which cooperatingly overlap, said bevelled faces being at an oblique angle to the direction of movement of the packing elements.

A further feature of the invention consists in forming the packing elements intermediate their ends with a series of grooves or recesses which result in producing a series of yielding portions or laminations, and in so shaping the cooperating followers that the latter press in part solidly against the packing elements while allowing adjacent portions of the packing elements to have readily yielding contact with the polished rod or other reciprocating element to be packed.

A still further feature of the invention consists in providing the rear faces of the packing elements with laterally spaced shoulders for cooperating with the respective followers thereby insuring that the followers shall effectively force the sides of the packing elements into contact with each other.

Another feature of the invention consists in forming the packing elements at their opposite ends with rearwardly projecting extensions or flanges which overlap portions of the followers, thereby increasing the end bearing surfaces of the packing elements without unduly increasing the amount of packing material and thus efficiently checking leakage around the ends of the packing even when the packing has become greatly worn through service.

In the drawings illustrating a preferred form of the invention:

Figure 3 is a view, partly in elevation and partly in section on the line 3—3, Figure 1.

Figure 4 is a sectional view on the line 4—4, Figure 3.

Figure 5 is a plan view of one of the followers.

Figure 6 is a vertical central section of one of the followers.

Figure 7 is a vertical central section of one of the packing elements.

Figure 8 is a sectional view on the line 8—8, Figure 7.

Figure 9 is a view, partly in elevation and partly in section, illustrating diagrammatically the manner in which pressure of the follower causes the adjacent packing element to have efficient sealing cooperation with a reciprocating wire line or cable.

Figure 1:
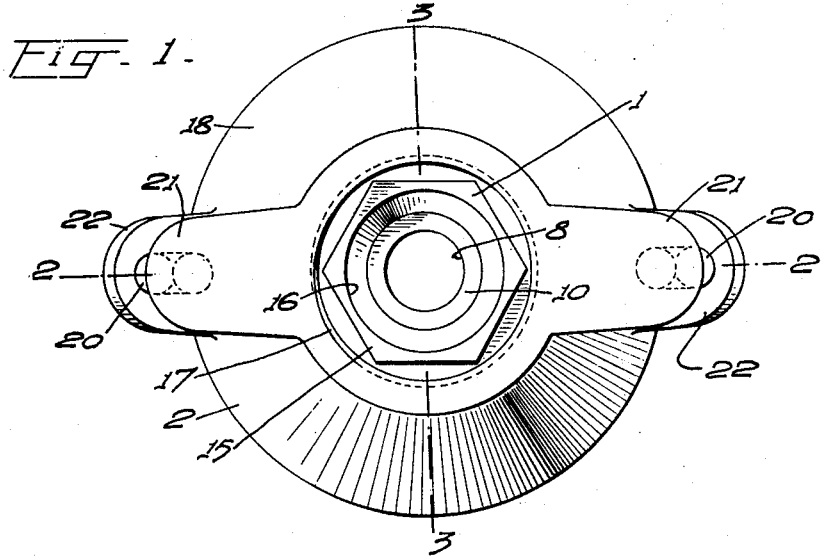
Figure 1 is a plan view of a stuffing box embodying the invention.
Figure 2:
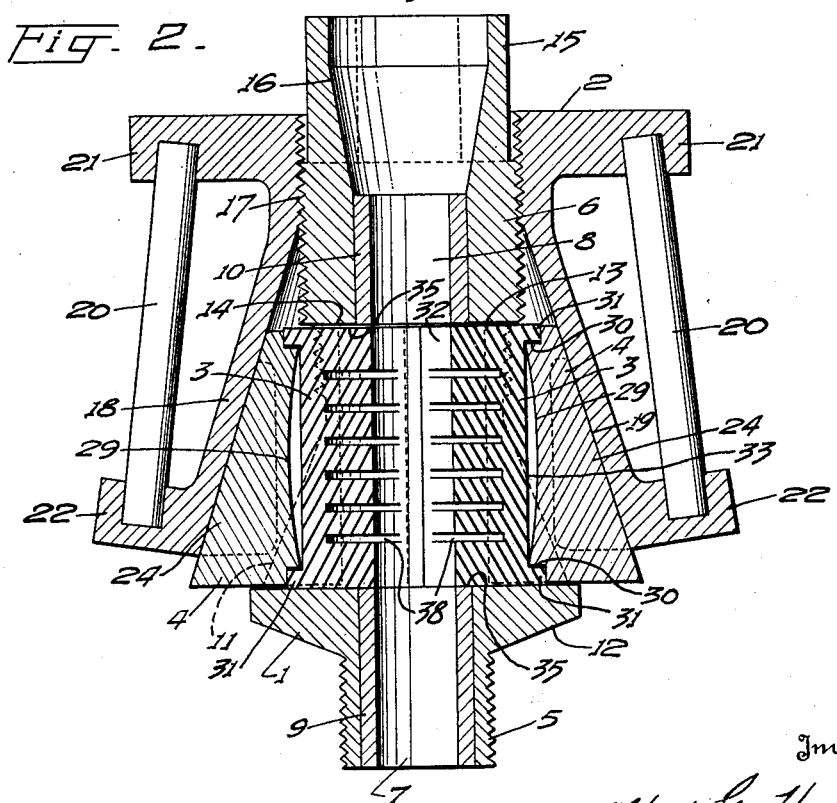
Figure 2 is a sectional view on the line 2—2, Figure 1.

Generally stated the stuffing box comprises a body member 1, a rotatable housing 2 having threaded engagement therewith, packing elements 3 and radially movable followers 4 which are adapted to be actuated by the housing to force the packing elements toward each other.

The main body member 1 of the stuffing box is fashioned with vertically spaced cylindrical portions 5 and 6 having axially alined openings 7 and 8 respectively for the passage of a polished rod, drilling line or similar reciprocating element. As the alined apertured portions 5 and 6 of the body member 1 of the stuffing box effectively guide the reciprocating element in a substantially straight line notwithstanding that lateral movements are imparted to the reciprocating member by its actuating mechanism, it is advantageous to provide said apertured portions 5 and 6 of the body member with interior linings or bushings of babbitt, 9 and 10 respectively.

The spaced cylindrical portions 5 and 6 of the body member are preferably externally threaded, the former for attachment to an oil well casing or tubing head, coupling or the like, and the latter for cooperation with an adjustably rotatable housing 2. The threaded cylindrical portions of the stuffing box member 1 are rigidly united by an intermediate portion which may conveniently be formed of frusto-conical sections 11 and 12 arranged base to base.

The upper conical section 11 and the lower part of the cylindrical portion 6 of the member 1 are provided with lateral openings or slots 13 and 14 which communicate with the axial passageway for the reciprocating element, the slots or openings being preferably radial and diametrically alined. To enable the stuffing box member 1 to be readily manipulated when assembling it with the casing or tubing head or other part upon which it is mounted, said member 1 is preferably provided above the threaded cylindrical portion 6 with a part 15 constituting a hexagonal wrench seat which projects upwardly above the rotatable housing member 2. This upwardly projecting wrench seat portion is centrally apertured, as at 16, to permit the passage of the reciprocating element, said aperture 16 preferably being of conical form, widening upwardly and terminating in a cylindrical portion of considerably greater diameter than the openings in the babbitt bushings 9 and 10. Oil or other lubricant may be introduced into the chamber of the member 15 so as to reduce friction between the polished rod and the bushing 10.

The rotatable housing 2 is threaded on the interior at its upper end, as indicated at 17 for cooperation with the exteriorly threaded upper cylindrical portion 6 of the body member 1. Below its interiorly threaded portion 17 the housing member is formed with a downwardly extending portion 18 which is open at its lower end and affords a downwardly flaring interior conical surface 19 having wedging cooperation with the followers 4. To enable the adjustable housing to be readily rotated with respect to the body member 1 of the stuffing box, the housing is preferably provided with oppositely disposed handles 20. These handles may be advantageously made of round iron bars which are placed in position in the mould when the housing member 2 is cast, the said housing member being provided at its upper and lower ends with suitable laterally projecting lugs 21 and 22 respectively in which the handles are anchored.

The followers 4 by which the packing elements 3 are forced toward the axis of the body member 1 are preferably respectively supported upon the lower walls of the slots 13 and 14 of the body member. They are of a height and width permitting them to move radially in said slots, their side walls 23 being advantageously formed as flat vertical faces which conform to the corresponding side walls of the slots in which they operate. By this means the side walls of the slots resist any tendency of the followers to rock or rotate when the housing member is turned for the purpose of forcing the followers inwardly. Each follower is formed as a wedge for cooperating with the conical wedging surface 19 of the housing. To enable the followers to have effective wedging cooperation with the housing in all relative positions of the parts each follower 4 is preferably fashioned with a rear conical surface of skeleton form comprising a centrally disposed tapering of inclined web portion 24 which conforms to the inclination of the conical surface 19 and contacts therewith in all positions throughout the range of adjustment of the housing 2 with respect to the main body member 1 of the stuffing box. Above and below the inclined web 24 the follower is provided on its rear side with curved, preferably circular, flanges 25 and 26 respectively whose outer faces are conical. The curvatures of the flanges 23 and 24 are preferably such that said flanges do not come into contact with the conical surface of the rotatable housing until the latter has reached the limit of its downward adjustment on the body member 1. By this means extended bearing contact of the followers upon the cooperating housing member 2 is at all times assured and the wedging pressure of the housing is directed centrally of the followers. The inner face of each follower 4 is provided on opposite sides with vertically extending shoulders 27 between which is a recess 28 for receiving the correspondingly formed portion of the adjacent packing element 3. This recess 28 is preferably of circularly curved cross-sectional form and is somewhat cupped vertically, as indicated at 29, to provide a surface which is dissimilar to the initial shape of the cooperating surface of the adjacent packing element 3, thus affording space for permitting the intermediate laminated portion of the neighboring packing element 3 to yield outwardly in a radial direction. Bordering the recesses 28 of the followers and at opposite ends of the latter are pockets 30 for receiving laterally projecting sealing flanges 31 with which each of the packing elements 4 is preferably provided at its opposite ends.

The packing elements 3 for cooperating with the reciprocating element to prevent the loss of oil or other fluid are preferably made of rubber. Each is movably mounted in one of the slots 13 and 14 respectively of the body member 1 of the stuffing box. The packing members 3 are formed with curved inner surfaces 32 and their backs are convexly curved, as indicated at 33, to conform with and fit into the corresponding recesses 28 of the respectively adjacent followers 4, the curvature of the backs of the packing elements preferably being approximately that of the inner curved surfaces 32 of said packings as such a construction enables the packing rubbers to be used until almost completely worn out and thereby avoids unnecessary loss of rubber. The opposite sides 34 of the packing elements 3 are preferably flat parallel surfaces which conform to and abut the lateral walls of the respective slots 13 and 14 into which the packing elements extend. The top and bottom end faces 35 of the packing members 3 are also preferably formed as flat parallel surfaces corresponding to the top and bottom walls of said slots. When the reciprocating element that is to be packed is in position between the packing elements 3, the pressure of the followers 4 forces the side and end faces of the packing elements into contact with the corresponding adjacent walls of the slots 13 and 14 of the body member 1 of the stuffing box, thereby forming seals preventing the escape of oil or other fluid. To increase the end bearing surface of the packing elements so as to prevent leakage around the ends of the packing even though the latter may have become greatly worn from service, each of the packing rubbers is preferably provided on its back at opposite ends with outwardly projecting sealing flanges 31 which overlap the respectively adjacent followers 4 and fit into the pockets or grooves 30 at the ends of the latter. The contacting inner edges of the oppositely disposed packing elements 3 are bevelled, as indicated at 36, thus enabling the packing members to overlap each other circumferentially with respect to the reciprocating member that is to be packed. On the back face of each of the packing elements 3 are vertically extending shoulders 37 which are engaged by the correspondingly spaced vertically extending shoulders 27 on the inner face of the neighboring follower 4. The pressure of the shoulders 27 of the followers upon the cooperating shoulders 37 of the packings expands the packing elements 3 at the shoulders, thus increasing the tightness of the lateral contact of the packing rubbers with the body member 1 of the stuffing box. The pressure of the followers applied to the shoulders 37 of the packing elements, being in line with the bevelled faces 36 of the latter tends to insure that the contacting edges of the packing elements shall maintain their circumferentially overlapping relation with the reciprocating element as wear of the packing proceeds.

The inner surface of each of the packing elements 3 is preferably provided with a plurality of grooves 38 which divide the packing member into tongues or laminations for enhancing its flexibility. This intermediate laminated section of the packing element stands opposite the cupped portion 29 of its adjacent follower 4 so that, as shown in Figure 9, when the follower 4 applies pressure to the packing, space is provided for allowing the flexible tongues to yield so as to conform to a reciprocating element such as a wire line. Because of the cup form of the followers 4 their pressure upon the packing elements 3 is greater at the ends of said packing elements, thus causing the ends of the packing rubbers to bear solidly against the polished rod or reciprocating wire line as well as causing the end faces of the rubbers to press tightly against the neighboring walls of the slots 13 and 14 in the body member 1 of the stuffing box. As heretofore pointed out the provision of means for allowing portions of the packing rubbers to yield outwardly decreases the danger of overheating the polished rod and avoids burning or excessively rapid wear of the rubber. While the particular cupped form of the followers 4 gives excellent results, especially if the reciprocating element be a polished rod, it is to be understood that other forms of followers permitting freedom of action of portions of the packing rubbers may be employed without departing from the scope of the invention.

I claim:

1. In a stuffing box, the combination with a body member having an aperture therethrough for the passage of a reciprocating element and having laterally opening slots communicating with said aperture, of a rotatable housing adjustably mounted upon said body member and having a tapering interior surface, yielding packing elements disposed in said slots, and followers interposed between said housing and the respective packing elements, the tapering surface of said housing being adapted to cooperate with said followers to cause the latter to press against the respective packing elements, and said followers and the packing elements being provided with cooperating initially dissimilar faces whereby the pressure exerted by the followers on the respective packing elements is greater at one portion of the packing elements than at another portion thereof.

2. In a stuffing box, the combination with a body member having an aperture therethrough for the passage of a reciprocating element and having laterally opening slots communicating with said aperture, of a rotatable housing adjustably mounted upon said body member and having a tapering interior surface, packing elements disposed in said slots, and followers interposed between said housing and the respective packing elements, portions of the inner faces of said followers and the neighboring surfaces of the respective packing elements being spaced to permit a portion of said packing elements to yield toward their respective followers, and the tapering surface of said housing being adapted to cooperate with said followers to cause the latter to press against the respective packing elements.

3. In a stuffing box, the combination with a body member having an aperture therethrough for the passage of a reciprocating element and having laterally opening slots communicating with said aperture, of a rotatable housing adjustably mounted upon said body member and having a conical interior surface, packing means within said slots, and followers movable toward the axis of said aperture for compressing said packing means, each of said followers being provided with an inclined web for cooperating with said conical surface of the housing member, the inclination of each of said webs corresponding to that of said conical surface.

4. In a stuffing box, the combination with a body member having an aperture therethrough for the passage of a reciprocating element and having laterally opening slots communicating with said aperture, of a rotatable housing adjustably mounted upon said body member so as to be movable in the direction of length of the axis of said aperture, said housing being formed with a tapered interior surface, oppositely disposed yielding packing elements movably mounted in said slots, each of said packing elements being recessed for receiving said reciprocating element and being provided with bevelled faces extending at an oblique angle to the direction of movement of the packing elements, the bevelled faces of one packing element being in overlapping contact with the bevelled faces of the opposed packing element, and wedging followers interposed between the respective packing elements and said housing and cooperating with said tapering interior surface.

5. In a stuffing box, the combination with a body member having an aperture therethrough for the passage of a reciprocating element and having laterally opening slots communicating with said aperture, of a housing having threaded engagement with said body member so as to be adjustably rotatable with respect to the latter, said housing having a tapering interior surface, yielding packing elements mounted in said slots so as to be movable toward the axis of said aperture, each of said packing elements being provided with bevelled faces formed at an oblique angle to the direction of movement of the packing elements, the bevelled faces of each packing element being in spaced relation and the bevelled faces on one packing element being respectively adapted to overlap the bevelled faces on the opposed packing element, and wedging followers engaging said tapering surface and cooperating with the respective packing elements to force the bevelled faces of the latter into contact.

6. In a stuffing box, the combination with a body member having an aperture therethrough for the passage of a reciprocating element and having laterally opening slots communicating with said aperture, packing elements disposed in said slots and movable toward the axis of said aperture, followers respectively cooperating with said packing elements to force them toward the axis of said aperture, and means encircling said body member and cooperating with said followers for actuating the latter, said packing elements being provided on their inner sides with contacting bevelled faces which are at an oblique angle to the direction of movement of the packing elements and being formed on their rear faces with shoulders which are substantially in transverse alinement with the respective bevelled faces, and said followers being provided with spaced shoulders for cooperating with said shoulders of the respectively adjacent packing elements.

7. In a stuffing box, the combination with a body member having a vertically extending aperture therethrough for the passage of a reciprocating element and having laterally opening slots communicating with said aperture, of a housing movably mounted upon said body member so as to be adjustable vertically with respect to the latter, said housing having a tapering interior surface, yielding packing elements disposed in said slots, said packing elements being recessed between their ends to increase the flexibility of their intermediate portions, and followers interposed between said housing and the respective packing elements, the tapering surface of said housing being adapted to cooperate with said followers to cause the latter to press against the respective packing elements, and said followers and the packing elements being provided with cooperating initially dissimilar faces whereby the pressure exerted by the respective followers on a portion of each packing element is greater than on another portion thereof.

8. In a stuffing box, the combination with a body member having an aperture therethrough for the passage of a reciprocating element and having slots which are open at their outer ends and communicate at their inner ends with said aperture, of a housing movably mounted upon said body member so as to be adjustable with respect to the latter in the direction of length of the axis of said aperture, yielding packing elements movably mounted in said slots, and followers interposed between said housing and the respective packing elements, said packing elements being recessed between their ends to increase the flexibility of their intermediate portions, said housing being adapted to cooperate with said followers to cause the latter to press against the respective packing elements, and said followers and the packing elements having contacting initially dissimilar faces whereby the pressure exerted by the followers on the packing elements is greater at the ends of the packing elements than at the intermediate portions thereof.

9. In a stuffing box, the combination with a body member having an aperture therethrough for the passage of a reciprocating element and having laterally opening slots communicating with said aperture, the end walls of said slots being substantially flat and parallel and lying in planes intersecting the axis of said aperture, yielding packing elements positioned in said slots and movable toward the axis of said aperture, the end faces of said packing elements adjacent said end walls of the slots being substantially flat and parallel and disposed in overlapping relation to said end walls respectively adjacent thereto, followers for cooperating with the respective packings to force the latter towards the axis of said aperture, and means for causing said followers to press inwardly upon their respective packing elements, said followers being cupped longitudinally and engaging the packing elements near the ends of the latter whereby said end faces of the packing elements are pressed against the end walls of said slots by said followers.

10. In a stuffing box, the combination with a body member having an aperture therethrough for the passage of a reciprocating element and having laterally opening slots communicating with said aperture, the upper and lower end walls of said slots being substantially flat and parallel and lying in planes intersecting the axis of said aperture, yielding packing elements positioned in said slots and movable toward the axis of said aperture, the end faces of said packing elements adjacent said end walls of the slots being substantially flat and parallel and disposed in overlapping relation to said end walls respectively adjacent thereto and each of said packing elements being provided on its rear face with rearwardly extending vertically spaced sealing flanges constituting extensions of said end faces of the packing elements, followers for cooperating with the respective packings to force the latter toward the axis of said aperture and adapted to force said end faces and said extensions into contact with the respectively adjacent end walls of said slots, said followers being removable from said slots in an outward radial direction, and means for causing said followers to press inwardly upon their respective packing elements, each of said followers being provided on its inner face with recesses for receiving said extensions of the end faces of said packing elements, and said recesses providing shoulders respectively supporting said extensions substantially throughout both vertically and horizontally to compel said extensions to yield toward said end walls when said yielding packing elements are subjected to pressure by said followers.

In testimony whereof I affix my signature.

ALFRED G. HEGGEM.